(12) United States Patent
Kim et al.

(10) Patent No.: US 10,717,052 B2
(45) Date of Patent: Jul. 21, 2020

(54) HYBRID TYPE FILTRATION STRUCTURE FOR FILTERING LIQUID

(71) Applicant: Korea Institute of Machinery & Materials, Daejeon (KR)

(72) Inventors: Jeong-Hwan Kim, Daejeon (KR); Yeong-Eun Yoo, Seoul (KR); Jae-Sung Yoon, Daejeon (KR); Tae-Joon Jeon, Gyeonggi-do (KR); Sun Min Kim, Incheon (KR); Seung-Hyun Kim, Incheon (KR); Moon-Ki Kim, Gyeonggi-do (KR); Dae-Joong Kim, Seoul (KR); Yun Jung Lee, Seoul (KR); Young-Rok Kim, Gyeonggi-do (KR); Young-Ho Seo, Gangwon-do (KR); No-Won Kim, Busan (KR)

(73) Assignee: KOREA INSTITUTE OF MACHINERY & MATERIALS, Daejeon (KR)

(*) Notice: Subject to any disclaimer, the term of this patent is extended or adjusted under 35 U.S.C. 154(b) by 340 days.

(21) Appl. No.: 15/531,206

(22) PCT Filed: Jan. 20, 2015

(86) PCT No.: PCT/KR2015/000575
§ 371 (c)(1),
(2) Date: May 26, 2017

(87) PCT Pub. No.: WO2016/085033
PCT Pub. Date: Jun. 2, 2016

(65) Prior Publication Data
US 2017/0326503 A1 Nov. 16, 2017

(30) Foreign Application Priority Data
Nov. 28, 2014 (KR) ........................ 10-2014-0167969

(51) Int. Cl.
*B01D 69/00* (2006.01)
*B01D 67/00* (2006.01)
(Continued)

(52) U.S. Cl.
CPC ......... *B01D 69/00* (2013.01); *B01D 67/0002* (2013.01); *B01D 67/0093* (2013.01);
(Continued)

(58) Field of Classification Search
CPC ........ B01D 17/00; B01D 17/02; B01D 39/00; B01D 39/14; B01D 39/16; B01D 39/20;
(Continued)

(56) References Cited

U.S. PATENT DOCUMENTS 9,486,742 B1 * 11/2016 Rempe .................. C23C 16/04
2005/0087491 A1    4/2005 Hennige et al.
(Continued)

FOREIGN PATENT DOCUMENTS

CN    1578702 A    2/2005
CN    101198398 A   6/2008
(Continued)

OTHER PUBLICATIONS

ISR for PCT/KR2015/000575 dated Aug. 25, 2015, 2 pages.
Office Action in CN Application No. 201580064829.0, dated Jul. 15, 2019, 4pp.

*Primary Examiner* — Allison G Fitzsimmons
(74) *Attorney, Agent, or Firm* — Hauptman Ham, LLP

(57) ABSTRACT

A hybrid type filtration structure for filtering liquid includes a first active layer, a porous supporting layer and a permeable layer. The first active layer has a first nano pore inner wall of which a function group included compound is combined with. The porous supporting layer has a plurality of pores and is disposed under the first active layer. The permeable layer is disposed under the porous supporting (Continued)

layer. The porous supporting layer includes a plurality of lipid bilayers having membrane protein inside of the pore, a molecule of water selectively passes through the membrane protein. The first nano pore passes through the first active layer vertically. The first nano pore and the pore are connected with each other through which liquid flows.

20 Claims, 8 Drawing Sheets

(51) Int. Cl.
*B01D 69/12* (2006.01)
*B01D 69/14* (2006.01)
*B01D 69/02* (2006.01)
*B01D 71/00* (2006.01)

(52) U.S. Cl.
CPC ............ *B01D 69/02* (2013.01); *B01D 69/12* (2013.01); *B01D 69/144* (2013.01); *B01D 69/148* (2013.01); *B01D 71/00* (2013.01); B01D 67/0025 (2013.01); B01D 67/0034 (2013.01); B01D 67/0037 (2013.01); B01D 67/0058 (2013.01); B01D 67/0062 (2013.01); B01D 67/0065 (2013.01); B01D 2325/02 (2013.01); B01D 2325/04 (2013.01)

(58) Field of Classification Search
CPC .... B01D 61/00; B01D 61/022; B01D 61/027; B01D 61/14; B01D 61/145; B01D 69/00; B01D 69/02; B01D 69/06; B01D 69/141; B01D 69/142; B01D 69/144; B01D 2325/02; B01D 2325/022; B01D 2325/14; B01D 2325/16; B01D 2325/18
USPC ............................ 210/500.21, 500.22, 490
See application file for complete search history.

(56) References Cited

U.S. PATENT DOCUMENTS

| | | | |
|---|---|---|---|
| 2009/0120874 A1* | 5/2009 | Jensen | B01D 69/02 210/638 |
| 2010/0270233 A1 | 10/2010 | Kim et al. | |
| 2013/0324664 A1 | 12/2013 | Kawakatsu et al. | |

FOREIGN PATENT DOCUMENTS

| | | |
|---|---|---|
| EP | 2243746 A1 | 10/2010 |
| EP | 3000523 A1 | 3/2016 |
| JP | 2005525224 A | 8/2005 |
| KR | 100626321 B1 | 9/2006 |
| KR | 1020100116345 A | 11/2010 |
| KR | 1020140015065 A | 2/2014 |
| WO | 2006/122566 A2 | 11/2006 |
| WO | 2014/164793 A2 | 10/2014 |

* cited by examiner

HYBRID TYPE FILTRATION STRUCTURE FOR FILTERING LIQUID

CROSS-REFERENCE TO RELATED APPLICATIONS

This application is a U.S. National Phase of International Application Number PCT/KR2015/000575, filed on Jan. 20, 2015, and claims priority under 35 U.S.C. § 119 to Korean Patent Application No. 10-2014-0167969, filed on Nov. 28, 2014 in the Korean Intellectual Property Office (KIPO).

BACKGROUND

1. Field of Disclosure

The present disclosure of invention relates to a hybrid type filtration structure for filtering liquid, and more specifically the present disclosure of invention relates to a hybrid type filtration structure for filtering liquid having a porous supporting layer including an active layer having a nano pore and a lipid bilayer having a membrane protein.

2. Description of Related Technology

Recently, liquid type filtering structure for removing contaminants from a liquid has been developed, as the industry is more developed and drinking water is more polluted due to environmental pollution and population growth.

A reverse osmotic membrane which is a conventional separation membrane with a high selectivity, has a pathway of free volume existing between polymer chains of a polymer material, and thus a molecule of water passes through and other molecules or ions are blocked by the reverse osmotic membrane. Here, the free volume which is a pathway is not arranged along one direction or does not have a shape of penetration. However, the free volume has a shape of complicatedly tangled or curved. Thus, even though the free volume is a relatively thin active layer, the free volume has a relatively long and complicated pathway and thus the selectivity is relatively good but the passing rate is relatively low.

A porous type separation membrane having a porous structure like a nano filter (NF), a micro filter (MF), etc., has a through porous structure, but is too large for separating a single molecule of water or a specific ion. Thus, permeability of the porous type separation membrane is good, but selectivity of the porous type separation membrane is relatively bad. In addition, a water filtering system in which recombination aquaporin is positioned in a vesicle layer, has relatively low durability due to instability of a lipid membrane structure.

Thus, a hybrid type filtration structure having high filtering efficiency, permeability and durability needs to be developed.

SUMMARY

The present invention is developed to solve the above-mentioned problems of the related arts. The present invention provides a hybrid type filtration structure for filtering liquid having a porous supporting layer including an active layer having a nano pore and a lipid bilayer having a membrane protein, capable of having high filtering efficiency, permeability and durability.

According to an example embodiment, a hybrid type filtration structure includes a first active layer, a porous supporting layer and a permeable layer. The first active layer has a first nano pore inner wall of which a function group included compound is combined with. The porous supporting layer has a plurality of pores and is disposed under the first active layer. The permeable layer is disposed under the porous supporting layer. The porous supporting layer includes a plurality of lipid bilayers having membrane protein inside of the pore, and a molecule of water selectively passes through the membrane protein. The first nano pore passes through the first active layer vertically. The first nano pore and the pore are connected with each other through which liquid flows.

According to another example embodiment, a hybrid type filtration structure includes a first active layer, a porous supporting layer and a second active layer. The first active layer has a first nano pore inner wall of which a function group included compound is combined with. The porous supporting layer has a plurality of pores and is disposed under the first active layer. The second active layer is disposed under the porous supporting layer, and has a second nano pore inner wall of which a function group included compound is combined with. The porous supporting layer includes a plurality of lipid bilayers having membrane protein inside of the pore, and a molecule of water selectively passes through the membrane protein. The first nano pore and the second nano pore respectively pass through the first active layer and the second active layer vertically. The first nano pore, the pore and the second nano pore are connected with each other through which liquid flows.

According to still another example embodiment, a hybrid type filtration structure includes a first active layer, a porous supporting layer and a permeable layer. The first active layer has a first nano pore inner wall of which a function group included compound is combined with. The porous supporting layer has a pore inside of which the first active layer is embedded. The permeable layer is disposed under the porous supporting layer. The porous supporting layer includes a plurality of lipid bilayers having membrane protein selectively inside of the pore, and a molecule of water passes through the membrane protein. The first nano pore passes through the first active layer vertically.

According to still another example embodiment, a hybrid type filtration structure includes a first active layer, a porous supporting layer and a second active layer. The first active layer has a first nano pore inner wall of which a function group included compound is combined with. The porous supporting layer has a pore inside of which the first active layer is embedded. The second active layer is disposed under the porous supporting layer, and has a second nano pore inner wall of which a function group included compound is combined with. The porous supporting layer includes a plurality of lipid bilayers having membrane protein inside of the pore, and a molecule of water selectively passes through the membrane protein. The first nano pore and the second nano pore respectively pass through the first active layer and the second active layer vertically. The pore and the second nano pore are connected with each other through which liquid flows.

In an example embodiment, the function group included compound is combined with the inner wall of each of the first and second nano pores, and thus the material needed to be removed may be easily removed from the liquid including water.

The active layer having the nano pore structure is included, so that the limitation of the reverse osmotic membrane having high selectivity and low permeability, and the limitation of the porous type separation membrane having high permeability and low selectivity, are overcome. In addition, a plurality of lipid bilayers having the membrane protein selectively permeating the function group included compound and the molecule of water is included in the first nano pore and the pore of the porous supporting layer, and thus the selectivity for the water may be enhanced.

Accordingly, in the present example embodiment, the nano pore having a size for a few molecule of water or ion to pass through in parallel is developed, and the compound having the active group capable of controlling the permeability via affecting the permeable molecule of water or ion may treat on the surface of the nano pore efficiently, so that the problem of the conventional separation membrane may be solved via the present example embodiment. Further, a plurality of lipid bilayers having the membrane protein selectively permeating the molecule of water is included in the porous supporting layer, and thus the permeability and the selectivity may be enhanced.

In the specification, "active group" may be defined as a group originally existing in the inner wall of the nano pore of the active layer, or formed via the surface treatment, and as a group capable of chemically or physically combined with the function group so as for the function group included compound to be combined with the inner wall of the nano pore. The active group formed at the inner wall of the nano pore via the surface treatment, may be chemically or physically combined with both the active layer having the nano pore structure and the function group included compound.

In the specification, "surface treatment" may be defined as a plasma treating for the inner wall of the nano pore of the active layer having the nano pore structure or as a forming the active group at the inner wall of the nano pore via the coating.

In the specification, "function group" may be defined as a group having selectivity to the molecule of water for the filtration, for example selectivity via interaction with the molecule of water, and having no selectivity to other molecules. Here, the interaction may be van der Waals force, electrostatic force, chemical bonding, etc. of the function group with the molecule of liquid, for example the molecule of water, for filtration.

In an example embodiment, a plurality of first nano pores may be formed in the first active layer, and a plurality of second nano pores is formed in the second active layer. The first nano pore and the second nano pore may respectively pass through the first active layer and the second active layer vertically, and thus the liquid like water may pass through. The inner walls of the first and second nano pores may have the active group with which the function group included compound is combined.

In an example embodiment, the active group may be one of $NH_2$, —COOH and OH.

The active group existing at the inner wall of the first and second nano pores may originally exist at the inner wall of the nano pore depending to the active layer having the nano pore structure, for example, in cases of polymer compound having —COOH active group or the active layer formed of inorganic compound having —OH group. When the active group does not exist at the inner wall of the nano pore originally, the active group may be formed via the surface treatment like the plasma treatment or the coating. Here, when the active group originally exist at the inner wall of the nano pore, the surface may be further treated to increase the density of the active group.

In an example embodiment, the porous supporting layer may be disposed under the first active layer, or may be embedded inside of the pore. The porous supporting layer may include a plurality of lipid bilayers having membrane protein inside of the pore, and the molecule of water selectively passes through the membrane protein.

In an example embodiment, the membrane protein may be aquaporin or aquaglyceroporin.

Aquaporin is membrane protein passively transporting the water inside of the cell membrane, and blocks the moving of ions and other solutes but selectively induces the molecule of water to move inside or outside of the cell. For example, the aquaporin may include aquaporin based all kinds of proteins revealed in human beings, plants or bacteria, such as yeast aquaporin (Aqy1), plant aquaporin (SoPIP2; 1), aquaglyceroporin which is Aqp3 or bacteria aquaporin (AqpZ). In addition, the aquaporin may be recombined protein that the aquaporin based protein is artificially revealed via the protein recombination DNA technology.

In an example embodiment, the membrane protein may be transmembrane protein passing through the lipid bilayer membrane of the lipid bilayer, and may exist at a position where two lipid bilayer make contact with each other.

Aquaporin or aquaglyceroporin is selected as the membrane protein, and thus the hybrid type filtration structure according to the present example embodiment efficiently and selectively filter the water passing through the protein included in the porous supporting layer.

In an example embodiment, each of the first and second nano pores may have a minimum diameter less than 50 nm, and between 0.1 nm and 10 nm. When the minimum diameter of each of the first and second nano pores is in the range above and the function group included compound is combined with the inner walls of the first and second nano pores, the effective diameter of the nano pore, the surface of which is functioned for the molecule of water or other ions via the mechanical, electrical or chemical interaction, is changed. For example, when the liquid is water, the effective diameter of each of the first and second nano pores increases but the effective diameter of each of the first and second nano pores decrease, and thus the molecule of water easily passes through the first and second nano pores but the ion or the other molecules of compound are prevented from passing through the first and second nano pores. The diameter of the second nano pore may be different from that of the first nano pore, when the diameter of the second nano pore is in the range above.

A vertically cross-sectional shape of each of the first and second nano pores is not limited, but the shape thereof may be optimized for more enhanced filtration. For example, the vertically cross-sectional shape thereof may be formed via the plasma surface treatment.

In an example embodiment, when the first and second nano pores exist a plural in the first and second active layer, an arrangement and a density thereof are not limited. For example, the number of the nano pores may be more than $10^6/mm^2$, and the arrangement of the nano pores may be uniform.

In an example embodiment, materials of the first and second active layers having the nano pore structure may not be limited. For example, the active layer may be one of polymer, copolymer, organic-inorganic composite material, inorganic material, metal material, carbon compound and mixture thereof, but not limited thereto. For example, the polymer may be thermosetting polymer like UV thermosetting polymer or soluble polymer which is dissolved by water or alcohol.

In an example embodiment, the copolymer may be block copolymer. For example the copolymer is one of PS-b-PAA, PS-b-PEO, PS-b-PLA, PS-b-PMMA, PS-b-PB, PS-b-PVP and mixture thereof, but not limited thereto. For example, the inorganic material may be aluminum oxide or silica.

In an example embodiment, at least portion of each of the first and second active layer has a thickness between 1 nm and 100 nm, and may be 50 nm or preferably less than 20 nm. In the range above, the first and second active layers may be effective at the permeability.

The function group included compound may have various kinds of function group according to the kinds of liquids for filtration. For example, when water is filtered, the function group included compound may include the function group having selectivity on the molecule of water. Accordingly, when water is filtered, the function group included compound having selectivity only on the molecule of water is used so that other molecules may not pass through the nano pore.

In an example embodiment, the function group included compound may include at least one function group of positive electric charge and negative electric charge. When the function group included compound may include both function groups of the positive electric charge and the negative electric charge, the compound having the positive electric charge function group and the compound having the negative electric charge function group may be disposed alternately.

In an example embodiment, the function group included compound may include at least one function group of polar function group and nonpolar function group. When the function group included compound may include both function groups of the polar function group and the nonpolar function group, the compound having the polar function group and the compound having the nonpolar function group are disposed alternately. Accordingly, the polar ion or compound of water, and the nonpolar compound of water may be removed at the same time.

According to the material to be removed is polar or nonpolar, the compound the polar or nonpolar function group which is less familiar to the molecule or ion to be removed may be disposed at an inlet of each of the first and second nano pores. Thus, the molecule or ion to be removed is less flowed into the first and second nano pores, and thus the molecule or ion to be permeated may be flowed into the first and second nano pores. Accordingly, the function groups familiar and unfamiliar to the materials to be permeated may be disposed properly or alternately inside of the first and second nano pores, and thus the materials to be permeated may be not stuck inside of the first and second nano pores and pass through the first and second active layers easily with relatively less energy.

In an example embodiment, the function group included compound may include a peptide function group. Here, the compound having the peptide function group may include a singular arginine-phenylalanine unit or a plurality of arginine-phenylalanine units. The peptide function group, like body aquaporin protein, may have the selectivity on the molecule of water to be effective to filter the water.

In an example embodiment, the hybrid type filtration structure may include the porous supporting layer. The porous supporting layer may have a porous structure, and may be disposed under the first active layer or may have a pore inside of which the first active layer is embedded. The pore of the porous supporting layer may have various kinds of shapes.

In an example embodiment, the porous supporting layer may support the first active layer, and may have various kinds of shape. The porous supporting layer may include one of polymer, anodic Aluminum Oxide, mono-chloroacetic acid.

In an example embodiment, the polymer may be one of polysulfone, polyethersulfone, polyphenylsulfone, polyetherethersulfone, polyetherketone, polyetheretherketone, polyphenyleneether, polydiphenylphenyleneether, polyvinylene cellulose acetate, cellulose diacetate, cellulose triacetate, polyphenylenesulphide, nitrocellulose, acetylation methyl cellulose, polyacrylonitrile, polyvinyl alcohol, polycarbonate, organic siloxane carbonate, polyester carbonate, organic polysiloxane, polyethylene oxide, polyamide, polyimide, polyamide-imide and polybenzimidazole, but not limited thereto.

In an example embodiment, the porous supporting layer may have a thickness between 1 µm and 100 µm, or between 10 µm and 100 µm or preferably between 40 µm and 100 µm. The porous supporting layer may include a plurality of pores having a diameter larger than the minimum diameter of the first nano pore or the second nano pore, by between 10 times and 1000 times. For example, the pore may have the diameter between 10 nm and 100 µm, or preferably between 50 nm and 10 µm.

In an example embodiment, the hybrid type filtration structure may include a permeable layer disposed under the porous supporting layer. Alternatively, the hybrid type filtration structure may include a second active layer. The second active layer may be disposed under the porous supporting layer, and may have a second nano pore inner wall of which the function group included compound is combined with.

In an example embodiment, the supporting layer having a plurality of micro pores having permeability may be additionally disposed under the permeable layer or the second active layer.

In an example embodiment, the first and second active layers may be fabricated via various methods. For example, when materials of the first and second active layers are the block copolymer, the mixture of the block copolymer and other polymer is coated, and is selectively etched to remove the other polymer, to fabricate the active layer having the nano pore.

For example, when the nano pore active layer composed of styrene-acrylic acid block copolymer is fabricated, the mixture of styrene-acrylic acid block copolymer and polyethylene oxide is coated via a spin coating to form a layer and is annealed in a THF solution vapor. Then, polyethylene oxide is removed via a chemical etching for example, using MeOH/NaOH solution, and thus PS-b-PAA active layer having the nano pore may be fabricated.

Alternatively, styrene-lactic acid block copolymer is fabricated and is coated on a wafer via the spin coating, and then is annealed in a solution vapor to form a PLA cylindrical phase vertically. Then, the PLA is hydrolysis via NaOH solution, to fabricate PS nano pore active layer.

In fabricating the nano pore active layer composed of styrene-acrylic oxide block copolymer, the mixture of styrene-acrylic oxide block copolymer and low molecular weight compound DBSA by 64:1 is coated on a silicon wafer via the spin coating and then is annealed to remove DBSA.

A method for forming the active layer on the porous supporting layer may not be limited. For example, the active layer having the nano pore is directly formed on the porous supporting layer. Alternatively, the active layer having the nano pore is formed on a silicon wafer, and then is transformed on the porous supporting layer.

A method for forming the active layer having the nano pore structure embedded in a pore of the porous supporting layer may be as followed but limited thereto. A size of pore structure of the original porous supporting layer is partially decreased via various methods, to be a nano pore structure, and then the active layer having the nano pore may be formed. For example, an inorganic particle like aluminum oxide is evaporated inside of the porous supporting layer via vacuum thin evaporation, for example e-beam vaporization, silica powder self-assembly vaporization, to form the active layer having the nano pore. Sputtering, pulsed laser deposition (PLD), chemical vapor deposition (CVD), atomic layer deposition (ALD), etc. may be used to form a thin film inside of the porous supporting layer, and not limited thereto. Materials for forming the active layer may be various kinds of metal oxide and metal except for aluminum oxide. Alternatively, the porous supporting layer is plasma treated to partially decrease the size of the pore, and then thermosetting polymer, such as UV thermosetting polymer is coated to form a crack having a nano size on the charged polymer, so that the active layer having the nano pore may be formed.

According to the present example embodiments, a hybrid type filtration structure has high filtering efficiency, permeability and durability, to be used for a filtering apparatus filtering liquid like water.

REFERENCE NUMERALS

Figure 1:
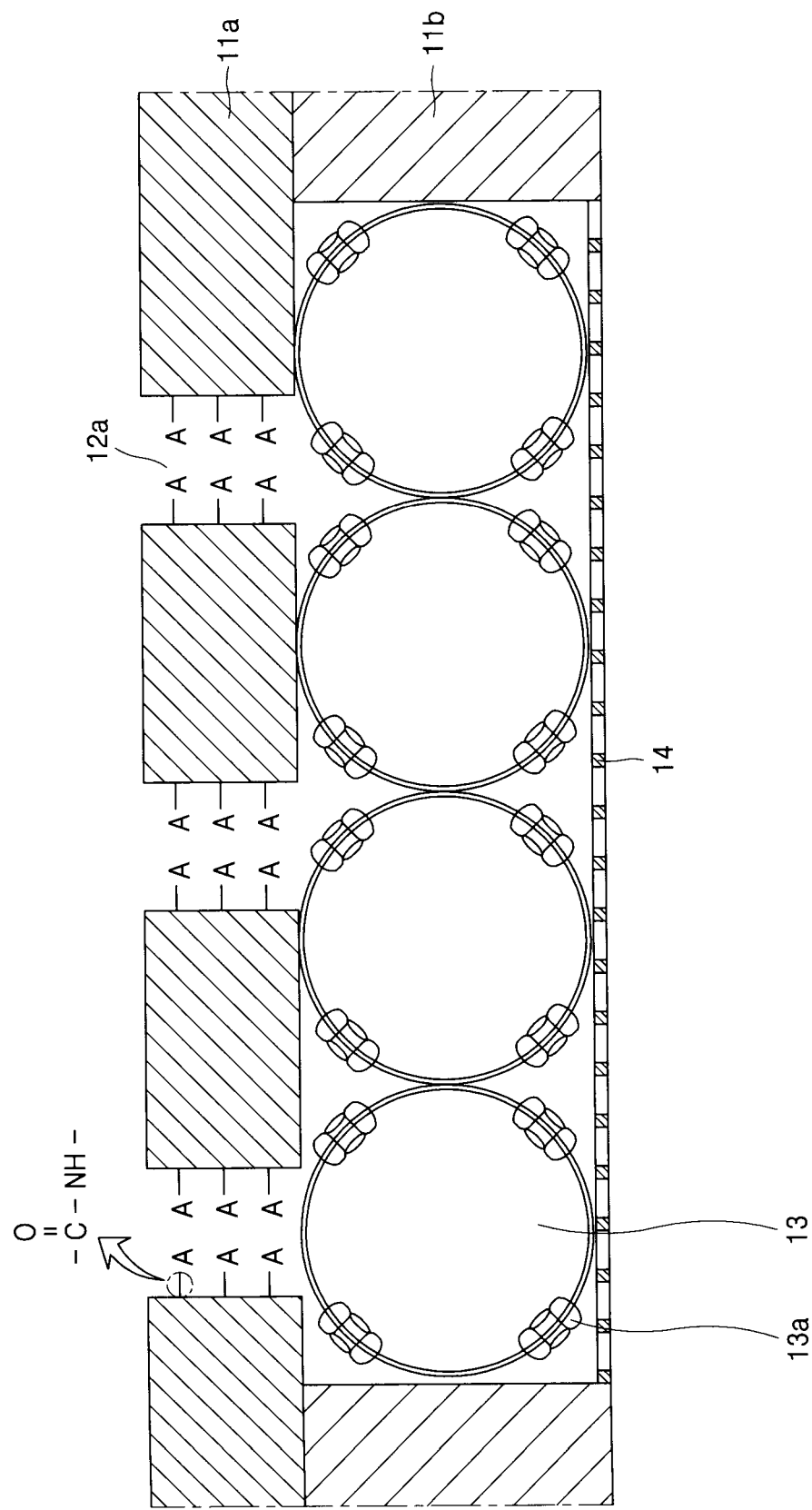
FIG. 1 is a cross-sectional view illustrating a hybrid type filtration structure according to an example embodiment of the present invention, the hybrid type filtration structure having a first active layer, a porous supporting layer and a permeable layer, the first active layer having a first nano pore, the porous supporting layer having a lipid bilayer having a membrane protein through which a molecule of water selectively passes.

11a: first active layer
11b: porous supporting layer
11c: second active layer
12a: first nano pore
12b: second nano pore
13: lipid bilayer having a membrane protein
13a: membrane protein
14: permeable layer

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. It will be understood that, although the terms first, second, third etc. may be used herein to describe various elements, components, regions, layers and/or sections, these elements, components, regions, layers and/or sections should not be limited by these terms.

Hereinafter, exemplary embodiment of the invention will be explained in detail with reference to the accompanying drawings.

Figure 3:
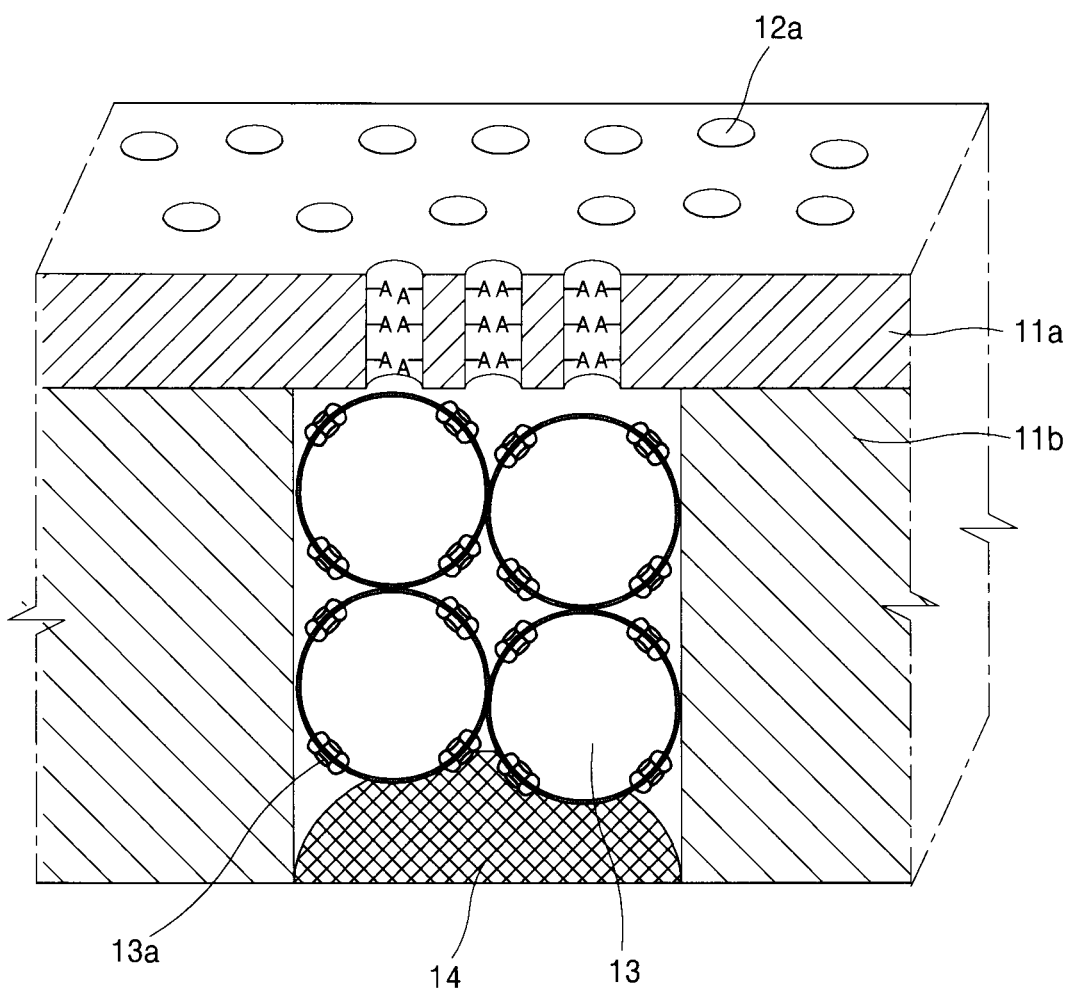
FIG. 3 is a perspective view illustrating the hybrid type filtration structure of FIG. 1, the hybrid type filtration structure having the first active layer, the porous supporting layer and the permeable layer, the first active layer having the first nano pore, the porous supporting layer having the lipid bilayer having the membrane protein through which a molecule of water selectively passes.

FIG. 1 is a cross-sectional view illustrating a hybrid type filtration structure according to an example embodiment of the present invention. FIG. 3 is a perspective view illustrating the hybrid type filtration structure of FIG. 1. The hybrid type filtration structure has a first active layer 11a, a porous supporting layer 11b and a permeable layer 14. The first active layer 11a has a first nano pore 12a. The porous supporting layer has a lipid bilayer 13 having a membrane protein 13a through which a molecule of water selectively passes.

Figure 2:
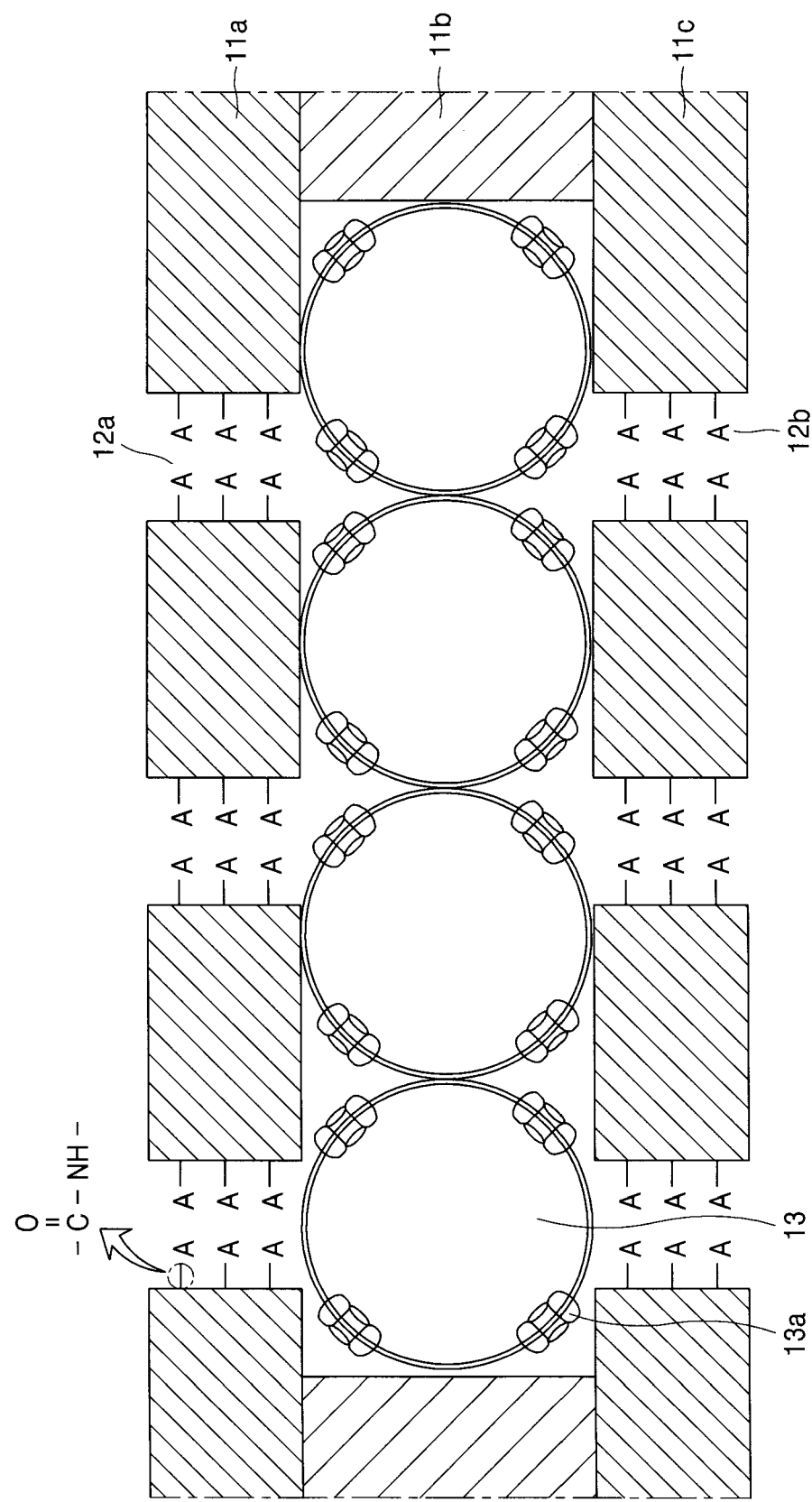
FIG. 2 is a cross-sectional view illustrating a hybrid type filtration structure according to another example embodiment of the present invention, the hybrid type filtration structure having a first active layer, a porous supporting layer and a second active layer, the first active layer having a first nano pore, the porous supporting layer having a lipid bilayer having a membrane protein through which a molecule of water selectively passes, the second active layer having a second nano pore.
Figure 4:
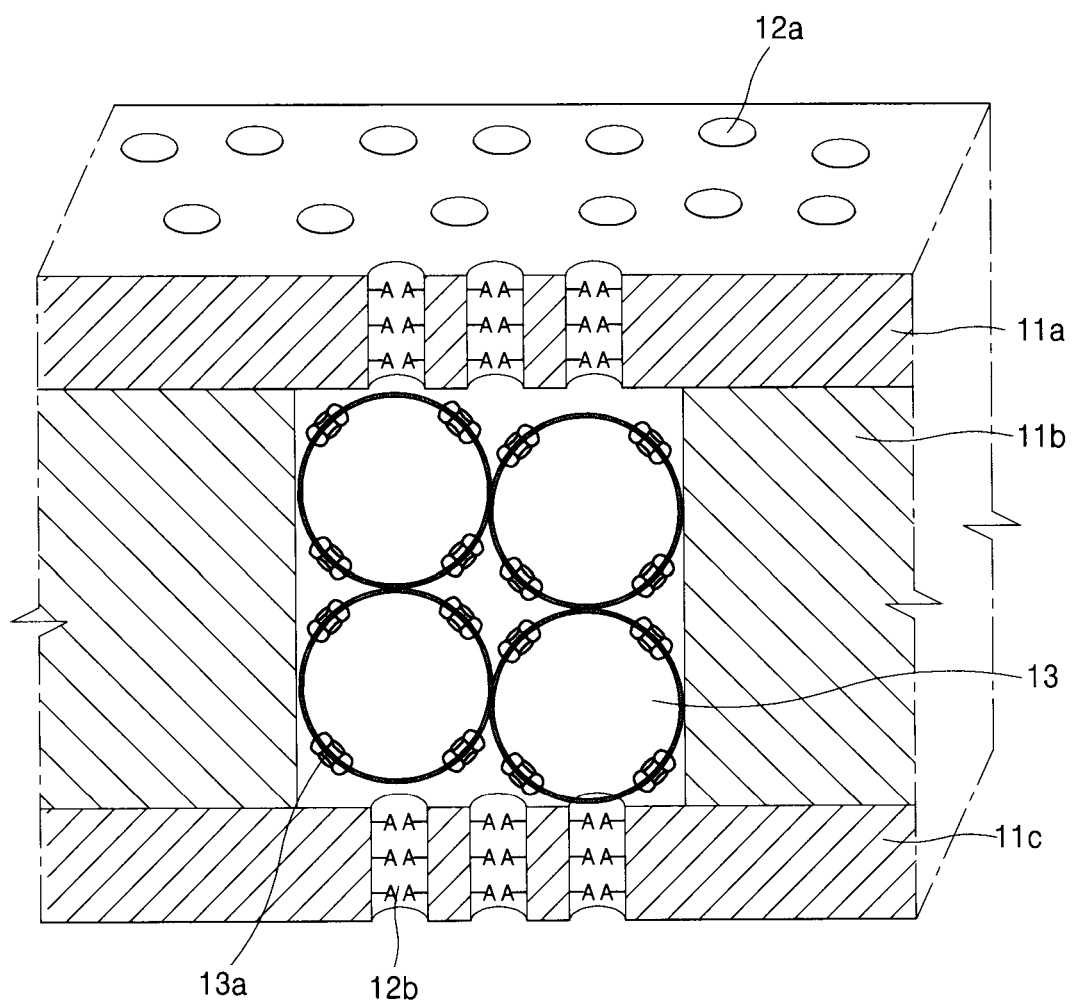
FIG. 4 is a perspective view illustrating the hybrid type filtration structure of FIG. 2, the hybrid type filtration structure having the first active layer, the porous supporting layer and the second active layer, the first active layer having the first nano pore, the porous supporting layer having the lipid bilayer having the membrane protein through which a molecule of water selectively passes, the second active layer having a second nano pore.

FIG. 2 is a cross-sectional view illustrating a hybrid type filtration structure according to another example embodiment of the present invention. FIG. 4 is a perspective view illustrating the hybrid type filtration structure of FIG. 2. The hybrid type filtration structure has a first active layer 11a, a porous supporting layer 11b and a second active layer 11c. The first active layer 11a has a first nano pore 12a. The porous supporting layer 11b has a lipid bilayer 13 having a membrane protein 13a through which a molecule of water selectively passes. The second active layer 11c has a second nano pore 12b.

Figure 5:
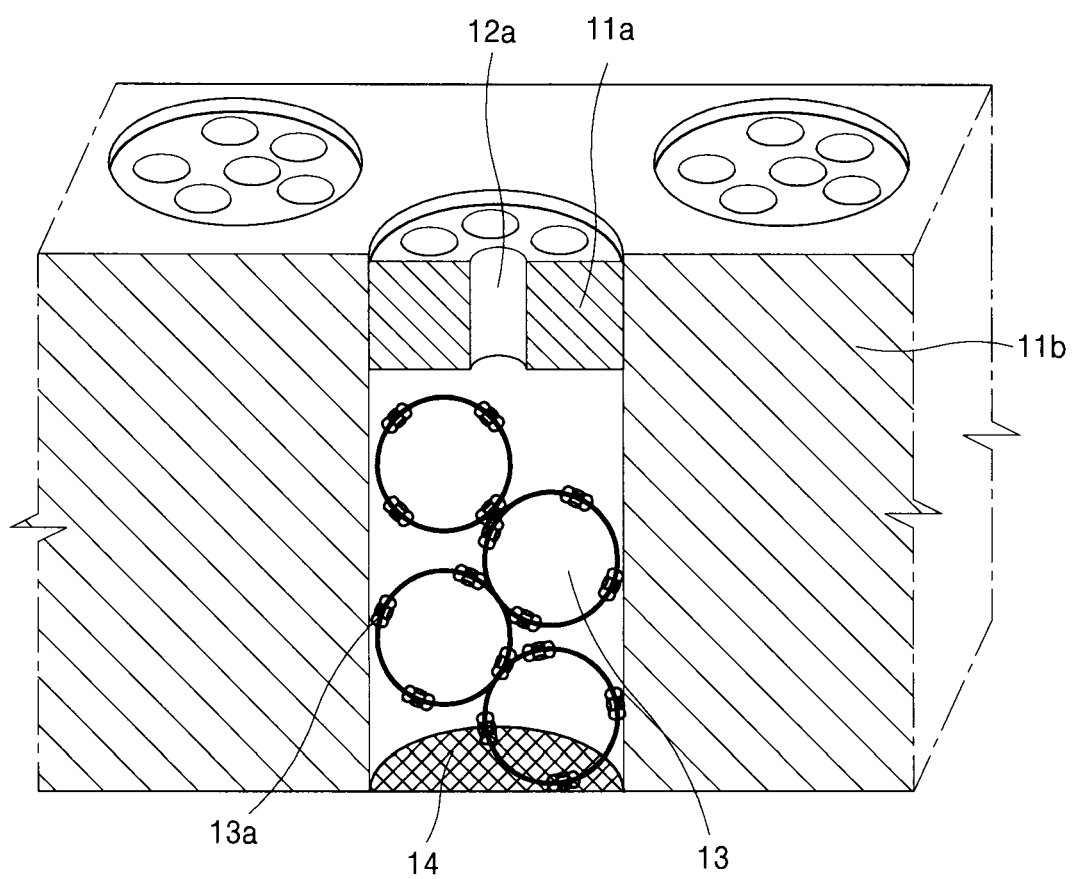
FIG. 5 is a perspective view illustrating a hybrid type filtration structure according to still another example embodiment of the present invention, the hybrid type filtration structure having a first active layer, a porous supporting layer and a permeable layer, the first active layer having a first nano pore embedded in the porous supporting layer, the porous supporting layer having a lipid bilayer having a membrane protein through which a molecule of water selectively passes.
Figure 6:
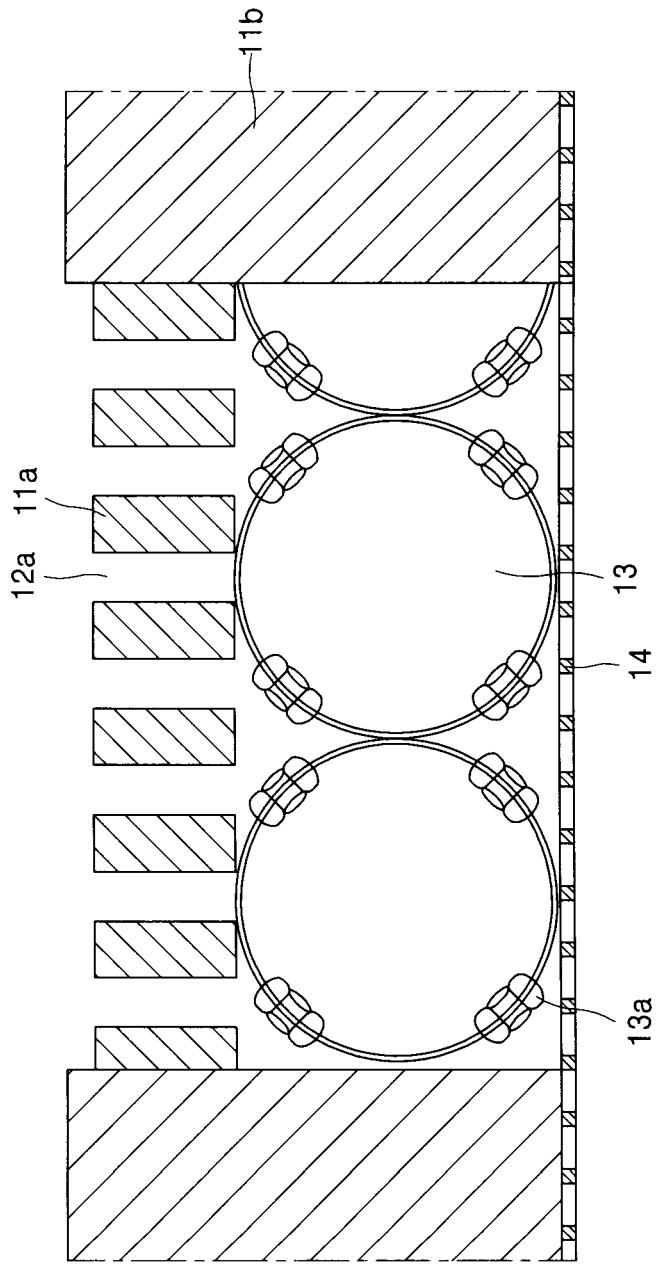
FIG. 6 is a cross-sectional view illustrating the hybrid type filtration structure of FIG. 5, the hybrid type filtration structure having the first active layer, the porous supporting layer and the permeable layer, the first active layer having the first nano pore embedded in the porous supporting layer, the porous supporting layer having the lipid bilayer having the membrane protein through which a molecule of water selectively passes.

FIG. 5 is a perspective view illustrating a hybrid type filtration structure according to still another example embodiment of the present invention. FIG. 6 is a cross-sectional view illustrating the hybrid type filtration structure of FIG. 5. The hybrid type filtration structure has a first active layer 11a, a porous supporting layer 11b and a permeable layer 14. The first active layer 11a has a first nano pore 12a embedded in the porous supporting layer 11b. The porous supporting layer 11b has a lipid bilayer 13 having a membrane protein 13a through which a molecule of water selectively passes.

Figure 7:
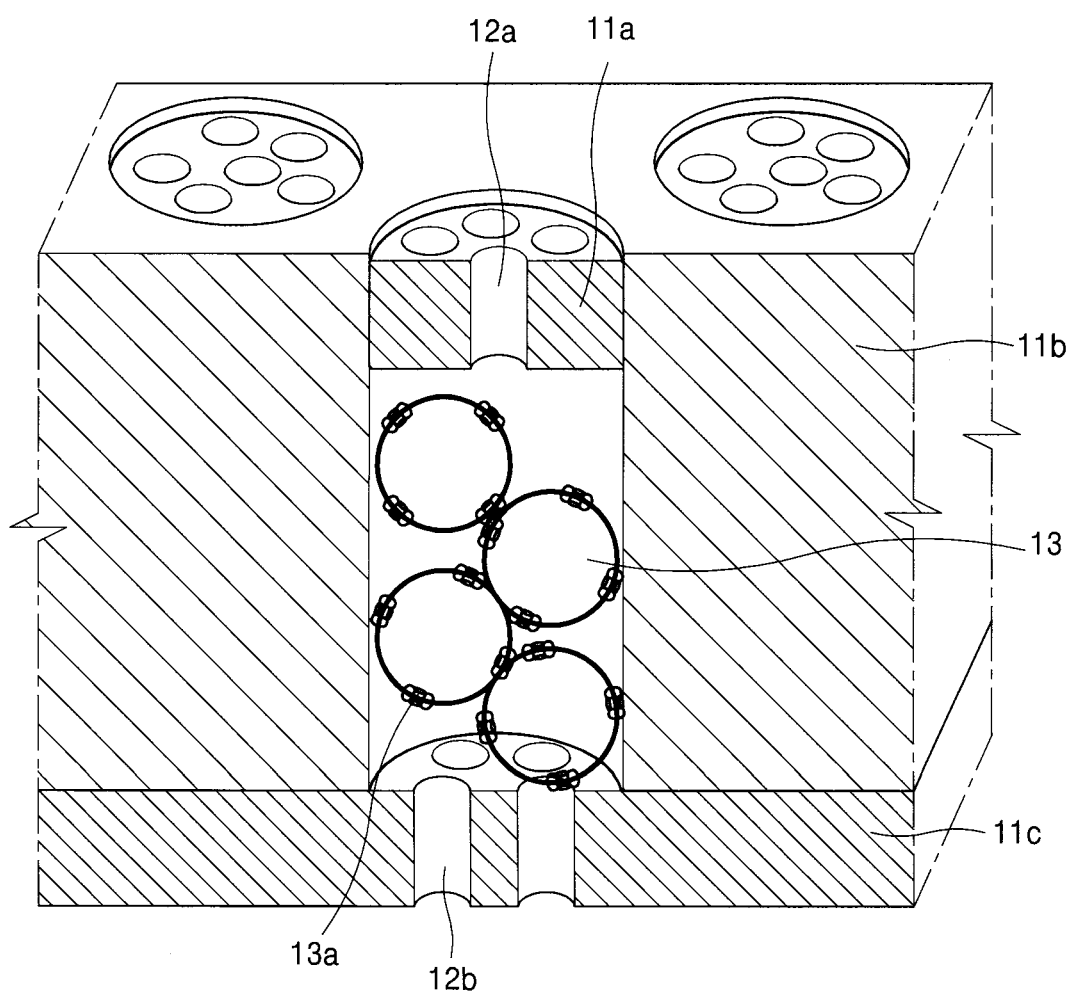
FIG. 7 is a perspective view illustrating a hybrid type filtration structure according to still another example embodiment of the present invention, the hybrid type filtration structure having a first active layer, a porous supporting layer and a second active layer, the first active layer having a first nano pore embedded in the porous supporting layer, the porous supporting layer having a lipid bilayer having a membrane protein through which a molecule of water selectively passes, the second active layer having a second nano pore.
Figure 8:
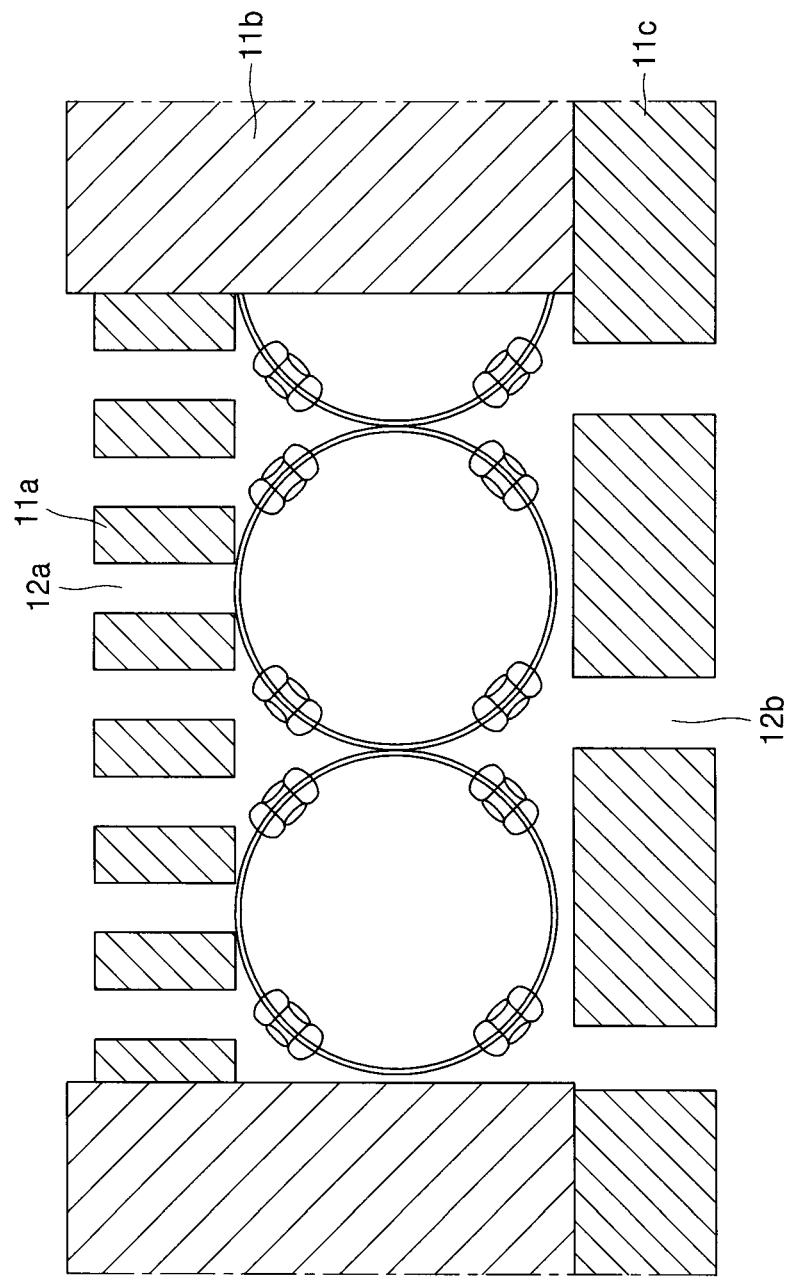
FIG. 8 is a perspective view illustrating the hybrid type filtration structure of FIG. 7, the hybrid type filtration structure having the first active layer, the porous supporting layer and the second active layer, the first active layer having the first nano pore embedded in the porous supporting layer, the porous supporting layer having the lipid bilayer having the membrane protein through which a molecule of water selectively passes, the second active layer having the second nano pore.

FIG. 7 is a perspective view illustrating a hybrid type filtration structure according to still another example embodiment of the present invention. FIG. 8 is a perspective view illustrating the hybrid type filtration structure of FIG. 7. The hybrid type filtration structure has a first active layer 11a, a porous supporting layer 11b and a second active layer 11c. The first active layer 11a has a first nano pore 12a embedded in the porous supporting layer 11b. The porous supporting layer 11b has a lipid bilayer 13 having a membrane protein 13a through which a molecule of water selectively passes. The second active layer has a second nano pore 12b.

A plurality of first nano pores 12a is formed through the first active layer 11a, and a plurality of pores 12b is formed through the porous supporting layer 11b. The first active layer 11a is substantially perpendicular to the porous supporting layer 11b. The first nano pore 12a passes through the first active layer 11a vertically, and the pores 12b passes through the porous supporting layer 11b. The first nano pore 12a is connected to the pore 12b so as for liquid to flow, and thus liquid molecules like a molecule of water may pass through. In addition, the first active layer 11a including the first nano pore 12a may be embedded in the porous supporting layer 11b.

A function group included compound A, like a arginine-phenylalanine unit having a peptide function group, is combined inside of the first nano pore 12a. Here, the first nano pore 12a and the function group included compound A are combined with each other via amid bond. Thus, the first nano pore 12a has selectivity to the molecule of water, and blocks the ion included in the water or other compound molecule to be passed through.

A permeable layer 14 is disposed under the porous supporting layer 11b, or the second active layer 11c having the second nano pore 12b is disposed under the porous supporting layer 11b. Thus, water passing through the first nano pore 12a and selectively passing through the membrane protein 13a passes through the permeable layer 14 or passes through the second nano pore 12b, so that the molecule of water selectively passes through as like in the first nano pore 12a and the ion included in the water or other compound molecule are blocked to be passed through. In addition, the permeable layer 14 existing in a lower portion of the porous supporting layer 11b or the second active layer 11c including the second nano pore 12b supports the lipid bilayer 13 having a membrane protein 13a selectively passing through the molecule of water so as not to be extruded from the pore 12b of the porous supporting layer 11b. For example, aquaporin may be used as the membrane protein 13a for filtering the water.

Having described the example embodiments of the present invention and its advantage, it is noted that various changes, substitutions and alterations can be made herein without departing from the spirit and scope of the invention as defined by appended claims.

What is claimed is:

1. A hybrid type filtration structure, having a porous supporting layer comprising:
    a first active layer having a first nano pore inner wall of which a function group included compound is combined with; and
    a porous supporting layer a plurality of pores disposed under the first active layer in contact with a lower portion of the first active layer,
    wherein the porous supporting layer further comprises
        a plurality of pores,
        a plurality of lipid bilayers having membrane protein inside of the plurality of pores,
        a molecule of water selectively passing through the membrane protein,
    wherein the first nano pore passes through the first active layer vertically, and
    wherein the first nano pore and the pore are connected with each other through which liquid flows,
    wherein the porous supporting layer extends past the plurality of lipid bilayers.

2. The hybrid type filtration structure of claim 1, further comprising a permeable layer disposed under the porous supporting layer.

3. The hybrid type filtration structure of claim 1, wherein the membrane protein is aquaporin.

4. The hybrid type filtration structure of claim 1, wherein the function group included compound comprises a function group having selectivity on the molecule of water.

5. The hybrid type filtration structure of claim 1, wherein the function group included compound comprises at least one function group of positive electric charge and negative electric charge.

6. The hybrid type filtration structure of claim 5 wherein the function group included compound comprises the function group in which a positive electric charge function group and a negative electric charge function group are disposed alternately.

7. The hybrid type filtration structure of claim 1, wherein the function group included compound comprises at least one function group of polar function group and nonpolar function group.

8. The hybrid type filtration structure of claim 7, wherein the function group included compound comprises the function group in which a polar function group and nonpolar function group are disposed alternately.

9. The hybrid type filtration structure of claim 1, wherein the function group included compound is a compound having a peptide function group.

10. The hybrid type filtration structure of claim 9, wherein the compound having a peptide function group comprises a singular arginine-phenylalanine unit or a plurality of arginine-phenylalanine units.

11. The hybrid type filtration structure of claim 1, wherein the porous supporting layer comprises one of polymer, anodic Aluminum Oxide, mono-chloroacetic acid.

12. The hybrid type filtration structure of claim 1, further comprising:
a second active layer disposed under the porous supporting layer, and having a second nano pore inner wall of which a function group included compound is combined with,
wherein the second nano pore passes through the second active layer vertically, and
wherein the first nano pore, the pore and the second nano pore are connected with each other through which liquid flows.

13. The hybrid type filtration structure of claim 12, wherein the inner wall of the first nano pore has an active group with which the function group included compound is combined, and the inner wall of the second nano pore has an active group with which the function group included compound is combined.

14. The hybrid type filtration structure of claim 13, wherein the active group is one of NH2, —COOH and OH.

15. The hybrid type filtration structure of claim 12, wherein the porous supporting layer has a thickness between 1 μm and 100 μm, the pore has a diameter between 50 nm and 10 μm, the first nano pore has a diameter between 0.1 nm and 10 nm, and the second nano pore has a diameter between 0.1 nm and 10 nm.

16. The hybrid type filtration structure of claim 12, wherein
the first active layer is one of polymer, copolymer, organic-inorganic composite material, inorganic material, metal material, carbon compound and mixture thereof, and
the second active layer is one of polymer, copolymer, organic-inorganic composite material, inorganic material, metal material, carbon compound and mixture thereof.

17. The hybrid type filtration structure of claim 16, wherein the copolymer is one of PS-b-PAA, PS-b-PEO, PS-b-PLA, PS-b-PMMA, PS-b-PB, PS-b-PVP and mixture thereof.

18. The hybrid type filtration structure of claim 12, wherein the first active layer has a thickness between 1 nm and 100 nm, and the second active layer has a thickness between 1 nm and 100 nm.

19. A hybrid type filtration structure, comprising:
a first active layer having a first nano pore inner wall of which a function group included compound is combined with;
a porous supporting layer having a pore inside of which the first active layer is embedded; and
a permeable layer disposed under the porous supporting layer,
wherein the porous supporting layer comprises a plurality of lipid bilayers having membrane protein inside of the pore, a molecule of water selectively passing through the membrane protein,
wherein the first nano pore passes through the first active layer vertically, and
wherein the porous supporting layer is in contact with a lower portion of the first active layer.

20. A hybrid type filtration structure, comprising:
a first active layer having a first nano pore inner wall of which a function group included compound is combined with;
a porous supporting layer having a pore inside of which the first active layer is embedded; and
a second active layer disposed under the porous supporting layer, and having a second nano pore inner wall of which a function group included compound is combined with,
wherein the porous supporting layer comprises a plurality of lipid bilayers having membrane protein inside of the pore, a molecule of water selectively passing through the membrane protein,
wherein the first nano pore and the second nano pore respectively pass through the first active layer and the second active layer vertically,
wherein the pore and the second nano pore are connected with each other through which liquid flows, and
wherein the porous supporting layer is in contact with a lower portion of the first active layer.

* * * * *